United States Patent Office 2,890,176
Patented June 9, 1959

2,890,176

FLUIDIZED SUSPENSION OF PHENYLMAGNESIUM CHLORIDE AND METHOD OF MAKING SAME

Hugh E. Ramsden, Scotch Plains, and Allen E. Balint, Woodbridge, N.J., assignors to Metal & Thermit Corporation, New York, N.Y., a corporation of New Jersey No Drawing. Application January 30, 1957
Serial No. 637,095

20 Claims. (Cl. 252—363.5)

The present invention relates to a method of increasing the fluidity of an arylmagnesium chloride suspension and to arylmagnesium chloride suspensions fluidized by this method.

In the reaction of magnesium and aryl chlorides the resulting suspension of arylmagnesium chloride is very viscous and consequently difficult to handle. For example, in the reaction between magnesium and chlorobenzene, even in the presence of excess chlorobenzene, the resulting suspension of phenylmagnesium chloride is viscous. Transfer of this suspension to other equipment for further reaction or other purposes becomes very difficult, necessitating heated apparatus and the constant use of special equipment, such as infra-red heat lamps. The phenylmagnesium chloride is fluid only at the higher temperatures of 80° C. and above, so that its usefulness is somewhat limited.

A broad object of the present invention is, therefore, to provide a new and improved method for substantially increasing the fluidity of arylmagnesium chloride suspensions without the application of heat and without undue dilution of said suspensions.

A further object of the invention is to provide a composition comprising an arylmagnesium chloride suspension fluidized in a new and improved manner.

It has been found, in accordance with the present invention, that the addition of a very small amount of an ether or a tertiary amine to a viscous suspension of an arylmagnesium chloride causes the suspension to become fluid at room temperature so that it can be handled almost as easily as water, can be transferred easily from one vessel or piece of equipment to another and can be added for further reaction without difficulty. The amount of fluidizer that is advantageously used for carrying out the purpose of the present invention is about 3 grams to 20 grams per mole of arylmagnesium chloride in the suspension.

The molar relationship of the amount of fluidizer employed to the arylmagnesium chloride in suspension is such that the arylmagnesium chloride is present in large excess as compared with the fluidizing agent added. Thus the fluidizer may be added to the arylmagnesium chloride suspension in the amount within the range of about .001 M to .4 M, and preferably about .003 M to .2 M, of fluidizer per mole of arylmagnesium chloride in the suspension.

The fluidizers of the present invention may be used to fluidize any liquid suspension of arylmagnesium chloride. It has particular application in fluidizing arylmagnesium chloride-aryl chloride mixtures which are prepared by the reaction of magnesium with an excess of aryl chloride above the stoichiometric requirements for the preparation of the arylmagnesium chloride. More particularly the present fluidizers are useful in fluidizing arylmagnesium chloride-aryl chloride mixtures prepared by the reaction of magnesium with aryl chlorides in the ratio of about 1 gm. atom of magnesium to 2 to 6 moles of aryl chloride. To the suspension so prepared it is advantageous to add the ether or tertiary amine fluidizing agent in the range of 3 grams to 20 grams of ether or tertiary amine per mole of arylmagnesium chloride prepared (or per-gram atom of magnesium employed in the preparation of the arylmagnesium chloride).

The fluidization of a phenylmagnesium chloride suspension in excess chlorobenzene is an application of the present invention which is a special interest. The fluidizing agents (ethers and tertiary amines) are used to fluidize phenylmagnesium chloride-chlorobenzene mixtures which are prepared by the reaction of 1 gram atom of magnesium with from 2 to 6 moles of chlorobenzene. The amount of fluidizer added to such reaction mixture is in the range of about 3 to 20 grams of fluidizer per mole of phenylmagnesium chloride produced in this reaction (or per-gram atom of magnesium employed in this reaction).

The fluidizers of the present invention are useful to fluidize arylmagnesium chloride-aryl chloride suspension, and more particularly, phenylmagnesium chloride-chlorobenzene mixtures, wherein the aryl chloride is present within the range of about from 1 to 5 moles of aryl chloride per mole of arylmagnesium chloride.

Any ether or tertiary amine may be used as a fluidizer for the purposes of the present invention. However, as a practical matter, those ethers and tertiary amines that have a molecular weight below 600 have been found to be most suitable.

As used herein the term "ether" includes any compound which contains the ether linkage

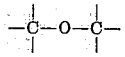

These include the simple monoethers, polyethers, acetals and ketals. A wide variety of ethers have been tested and have proved to be operative. More specifically, the ethers that are used in this invention are defined by the following formulae:

(1) $\quad\quad\quad\quad (X-)OR$ wherein X— is a radical of the class R—, ROR'—, and $R(OR''-)_n$ in which R is a monovalent aliphatic or aromatic radical; R' is a divalent aliphatic or aromatic radical; R'' is a divalent alkylene radical and $n$ is a whole number preferably. More particularly R in Formula 1 may be monovalent radicals selected from the class consisting of alkyl, chloroalkyl, alkenyl, carbocyclic aryl radicals having up to 3 rings in the molecule, and R' is a divalent radical selected from the class consisting of alkylene, carbocyclic arylene radicals having up to 3 rings in the molecule and carbocyclic aralkylene radicals having up to 3 rings in the molecule, and R'' is as defined above.

The preferred ether fluidizers of the present invention may be defined by the general formula (X—)OR wherein (X—) is radical of the class consisting of R—, ROR', and $R(OR''-)_n$ in which R is monovalent radical selected from the class consisting of alkyl, chloroalkyl, alkenyl, hydrocarbon carbocyclic aryl radicals having up to 3 rings in the molecule and hydrocarbon carbocyclic aralkyl radicals having up to 3 rings in the molecule; R' is a divalent radical selected from the class consisting of alkylene radicals, hydrocarbon carbocyclic arylene radicals having up to 3 rings in the molecule, and hydrocarbon carbocyclic aralkylene radicals having up to 3 rings in the molecule; R'' is a divalent alkylene radical having from 1 to 4 carbon atoms in the chain and $n$ has a value from 1 to 4.

The chain length of the alkyl and alkylene radicals mentioned above can vary to a large extent. However, the compounds containing an alkyl or alkylene chain containing up to 30 carbon atoms and, preferably, up to 20 carbon atoms in the chain are most suitable for the present invention.

It is to be understood that where R, R' or R" occur more than once in the above formulas, it does not indicate that in each occurrence each R, R' or R" need necessarily have the same value. Thus, for example, the ether designated as ROR may be a symmetrical ether or a mixed ether.

Any ether as defined above is operative for the present purposes. However, as a practical matter, it has been found that an ether having a molecular weight no higher than about 600 and, preferably no higher than about 525, is most suitable.

As used herein the term "tertiary amine" defines an organic nitrogen compound containing at least one trivalent nitrogen atom, all of the valences of which are bonded to carbon, and wherein said valences are bonded to at least two different carbon atoms. The carbon atoms so bonded to nitrogen may also carry various substituent groups or may constitute a part of a heterocyclic ring structure. The tertiary amines employed as fluidizers in this invention may be mono or polyamines wherein at least one of the amino groups is a tertiary amine group as defined. It is not necessary, in the case of the polyamines, for all of the amino groups to be tertiary amine groups.

Any tertiary amine falling within the above definition is operative for the present purposes. However, as a practical matter, it has been found that tertiary amines having a molecular weight no higher than 350 and preferably no higher than 300 are most suitable for the present purposes.

A wide variety of tertiary amines have been tested and found to be operative as fluidizers in the present invention. These include tertiary amines of the type $R_3N$ where R is an organo group bonded to nitrogen through carbon and in which R may be a hydrocarbon group, or a substituted hydrocarbon group. Among these types of tertiary amines may be the mentioned trialkylamines, triarylamines and triaralkyl amines. The tertiary amines encompassed in this invention also include the N substituted amide types having the grouping

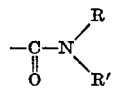

wherein R and R' are the same or different organo groups bonded to N through carbon; and N substituted polyamines of the type

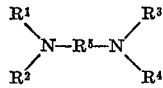

wherein $R^1$ and $R^2$ are organo groups bonded to nitrogen through carbon, $R^5$ is a divalent organo group wherein two carbon atoms of said organo group are each bonded to a separate nitrogen atom of said formula and $R^3$ and $R^4$ are hydrogen or have the same values of $R^1$ and $R^2$; the N substituted amino alcohols and nitriles of the type

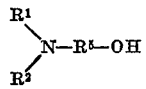

and

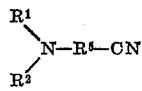

wherein $R^1$ and $R^2$ have the same significance as described above and $R^5$ is a divalent organo radical bonded to nitrogen and oxygen or carbon of a CN group of said formula through carbon; and N substituted ureas of the type

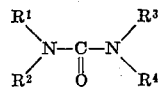

wherein $R^1$, $R^2$, $R^3$ and $R^4$ are as defined above. The tertiary amines employed in this invention also included the N substituted amines and nitrogen heterocyclic compounds which contain the group

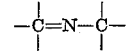

More specifically, the tertiary amines that are useful as fluidizers in the present invention may be defined as selected from the class of compounds having the general formulas $R_3N$,

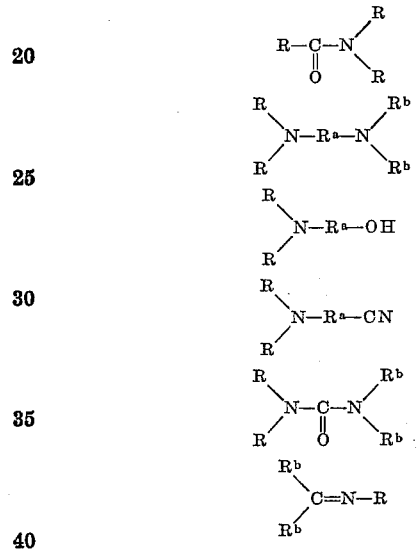

and heterocyclic nitrogen compounds containing the grouping —C=N—C— which contain, aside from the carbon atoms in the ring, only nitrogen and sulfur heterocyclic atoms and which contain up to 3 rings in the structure, wherein the R's are the same or different and are monovalent radicals selected from the class consisting of alkyl, carbocyclic aryl radicals having up to 3 rings in the structure and carbocyclic aralkyl radicals having up to 3 rings in the structure; $R^b$'s are the same or different and are selected from the class consisting of hydrogen, alkyl, carbocyclic aryl radicals having up to 3 rings in the structure and carbocyclic aralkyl radicals having up to 3 rings in the structure; and $R^a$ is a divalent radical selected from the class consisting of alkylene radicals, arylene radicals having up to 3 rings in the structure and aralkylene radicals having up to 3 rings in the structure. The alkyl and alkylene radicals in the above formula may be of any size, however, as a practical matter, these radicals containing up to 30 carbon atoms, and preferably, up to 20 carbon atoms are most suitable for this invention.

In the preferred tertiary amines used in the present invention the organo groups defined by R, $R^a$ and $R^b$ above are the corresponoding hydrocarbon groups falling within the definition of these groups as given.

The fluidizers of the present invention may be used to fluidize any liquid suspension of arylmagnesium chloride and, particularly, a suspension of the arylmagnesium chloride in excess of the corresponding aryl chloride from which it is made by the reaction with magnesium. Preferred embodiments of this invention are the arylmagnesium chlorides prepared from chlorobenzene, p-chlorotoluene and meta-chlorotoluene.

The following examples illustrate the manner in which the principle of the invention can be applied, but are

Example 1

A quantity of phenylmagnesium chloride suspension was prepared as follows: A mixture containing in the ratio of one g. atom of magnesium turnings to 5.0 moles of commercial chlorobenzene and 0.5% by weight of the magnesium of zinc chloride was prepared in a one liter, 3-necked flask equipped with a stainless steel anchor stirrer, reflux condenser, a thermometer, and a Glas-col heater. All the joints were glass. This mixture was stirred and heated to reflux. Forty minutes after reflux began, a greenish color developed in the mix indicating that the reaction had started. Heating was continued for 10 hours longer.

The phenyl magnesium chloride suspension, even in the presence of this large excess of chlorobenzene, when cooled to room temperature became an extremely viscous mass. Transfer of this material to other equipment or its addition to other materials for further reaction would be very difficult, necessitating heated apparatus and the constant use of equipment such as infra-red heat lamps.

To determine the yield of phenylmagnesium chloride one g. atom of magnesium turnings, 5.0 moles of commercial chlorobenzene and 0.5% by weight of the magnesium and zinc chloride were reacted as described above. The mixture was cooled, diluted with anhydrous ethyl ether and made up to one liter of solution in a volumetric flask by the addition of more ether. The solution was shaken to disperse solids, allowed to settle for a moment, and a 20 ml. sample was pipetted into a 500 ml. Erlenmeyer flask containing 50 ml. water and 50 ml. of 0.5 N $H_2SO_4$. This mixture was heated on a steam bath for thirty minutes. 1.5 ml. of 0.04% bromocresol purple was used as an indicator for the back-titration with 0.2 N NaOH solution and the yield was calculated. This is the well known Gilman titration, somewhat modified. The yield for this run (on the average of 2 titrations) was 82.9%.

Example II

The quantity of phenyl magnesium chloride suspension prepared in the first paragraph of Example I was cooled to about 70° C. and poured into four-ounce wide mouth screw cap bottles (which had previously been flushed with dry nitrogen) to a total of about 90 grams of mixture in each bottle. These 90 gram samples contain phenyl magnesium chloride and chlorobenzene in the ratio of approximately 1 mole of phenyl magnesium chloride to 5 moles of chlorobenzene (i.e., in the ratio of about 18 grams of phenylmagnesium chloride to about 72 grams of chlorobenzene). These were then capped and allowed to cool to room temperature over night. A sample of the fluidizer to be tested then was added to the bottle, stirred in with a stirring rod, and the mixture then manually shaken until the fluidizer was dispersed. The bottles were allowed to stand over night and then classified by viscosity. An arbitrary set of viscosities was set up in the following numerical scale: −1 (viscous, but less so than blank), 2 less viscous than 1), 3 (medium viscosity, free flowing), 4 (thin), 5 (very thin, watery).

Ratings were established visually using two bottles at a time for comparison of flow upon inversion of the bottles. The blank (phenylmagnesium chloride free of fluidizer) was extremely viscous and flowed very slowly, taking several minutes to flow after inversion. The addition of certain of the above fluidizers, having a rating of 5, to the cool viscous phenylmagnesium suspensions, with stirring, immediately eliminated the viscosity problem. The material to which these fluidizers were added became thin and handled as easily as water. These suspensions thus fluidized, can be transferred from one piece of equipment to another and can be added to a material for additional reactions without difficulty. The amounts of fluidizers used were 1 ml. per bottle (for liquids) or 1 gram per bottle (for solids), unless otherwise stated.

The results of these additions are listed below, the fluidizers being listed according to their increasing molecular weight:

| Fluidizers—Name | Mol Wt. (Approx.) | Rating |
|---|---|---|
| Furan: | | |
| 1 ml | 68 | 1 |
| 2 ml | | 2 |
| 3 ml | | 2 |
| Ethyl ether | 74 | 5 |
| Dimethyl ether of ethylene glycol | 90 | 3 |
| Diallyl ether | 98 | 4 |
| n-Butyl vinyl ether | 101 | 1 |
| Isopropyl ether (impure) | 102 | 4 |
| Ethyl butyl ether | 102 | 5 |
| Diethyl formal | 104 | 4 |
| Methyl phenyl ether | 108 | 2 |
| Methyl phenyl ether, 1.46 grams | 108 | 3 |
| Diethyl acetal | 118 | 5 |
| Phenetole | 122 | 2 |
| p-Cresyl methyl ether | 122 | 3 |
| Allyl phenyl ether | 135 | 2 |
| o-Cresyl ethyl ether | 136 | 2 |
| m-Cresyl ethyl ether | 136 | 2 |
| Hydroquinone dimethyl ether | 138 | 4 |
| Di-chloroethyl ether | 143 | 2 |
| n-Propyl acetal | 145 | 4 |
| n-Butyl phenyl ether | 150 | 1 |
| 2-chloroethyl phenyl ether | 156 | 1 |
| Methyl beta naphthyl ether | 158 | 1 |
| n-Amyl ether | 158 | 2 |
| Diethyl ether of diethylene glycol | 162 | 5 |
| Resorcinol diethyl ether | 166 | 2 |
| Hydroquinone diethyl ether | 166 | 3 |
| Phenylacetaldehyde diethyl acetal | 166 | 3 |
| Diphenyl ether | 170 | 1 |
| Ethyl alpha naphthyl ether | 172 | 1 |
| Dimethyl ether of triethylene glycol | 178 | 3 |
| o-Methoxybiphenyl | 184 | 1 |
| Dibenzyl ether | 198 | 3 |
| Dimethyl ether of tetraethylene glycol | 222 | 4 |
| Hydroquinone dibenzyl ether | 290 | 2 |
| Dodecyl ether on an equiv. wt. (to ethyl ether) basis, 5 grams | | 5 |
| n-Octadecyl ether on an equiv. wt. basis, 7 grams | 522 | 5 |
| N-ethylethyleneimine | 71 | 5 |
| Dimethylformamide | 73 | 4 |
| Dimethylaminopropionitrile | 98 | 3 |
| Triethylamine | 101 | 5 |
| Methyleneaniline | 105 | 3 |
| Diethylaminoethylamine | 116 | 3 |
| Diethylaminoethanol | 117 | 1 |
| Dimethylaniline | 121 | 3 |
| Benzimidazole | 128 | 2 |
| Benzothiazole | 135 | 3 |
| Diethylaniline | 149 | 1 |
| Benzyl diethylamine | 163 | 5 |
| Tributylamine | 185 | 5 |
| Triamylamine | 227 | 3 |
| N,N,N',N' tetra-butyl urea | 284 | 3 |
| Cetyldiethylamine | 297 | 2 |

When one of the above fluidizers having a rating of 5 (for example, ethyl ether) is added to the phenylmagnesium chloride suspension, the character of the suspension changes radically and extremely rapidly from a heavy, thick thixotropic gel to a very thin liquid. The original material does not separate into a solid and liquid phase whereas the thinned material does. However, the phases are easily redispersed by gentle agitation. Thus, the addition of the above fluidizers to cool viscous phenylmagnesium chloride suspensions, with stirring, immediately eliminates the viscosity problem. The material becomes thin and handles as easily as water, it can be transferred from one piece of equipment to another and can be added to a material or additional reactions without difficulty.

While the invention has been described with particular reference to specific embodiments, it is to be understood that it is not to be limited thereto, but is to be construed broadly and restricted solely by the scope of the appended claims.

What is claimed is:

1. The method of fluidizing a viscous suspension of phenylmagnesium chloride in chlorobenzene to provide a mixture containing substantial amounts of phenylmagnesium chloride which comprises adding to said suspension a small molar fraction, as compared with the number of moles of phenylmagnesium chloride present in said suspension, of a fluidizer for said suspension selected from the class consisting of tertiary amines and ethers, whereby a mixture is produced consisting predominantly of phenylmagnesium chloride and suspending medium said fluidizer having a molecular weight which does not exceed 600.

2. A method according to claim 1 wherein the chlorobenzene and phenylmagnesium chloride are present in said mixture within the range of about 1 to 6 moles of chlorobenzene per mole of phenylmagnesium chloride after addition of said fluidizer.

3. A method according to claim 1 wherein said fluidizer is an ether having a molecular weight which does not exceed 525.

4. A method according to claim 1 wherein the fluidizer added is a tertiary amine fluidizer having a molecular weight which does not exceed 300.

5. A method according to claim 3 wherein the fluidizer is added in the ratio of about .001 M to .4 M of fluidizer per mole of phenylmagnesium chloride in suspension.

6. A method according to claim 4 wherein the fluidizer is added in the ratio of about .001 M to .4 M of fluidizer per mole of phenylmagnesium chloride in suspension.

7. A method according to claim 5 wherein the chlorobenzene and phenylmagnesium chloride are present in said suspension within the range of 1 to 6 moles of chlorobenzene per mole of phenylmagnesium chloride after addition of said fluidizer.

8. A method according to claim 6 wherein the chlorobenzene and phenylmagnesium chloride are present in said suspension in the ratio of 1 to 6 moles of chlorobenzene per mole phenylmagnesium chloride after addition of said fluidizer.

9. A method of fluidizing a viscous suspension of phenylmagnesium chloride in chlorobenzene, prepared by a process comprising the reaction of chlorobenzene with magnesium in the ratio of 2 to 6 moles of chlorobenzene per gram atom magnesium, which comprises adding to said suspension from 3 to 20 grams of a fluidizer, per mole of phenylmagnesium chloride present in said suspension, selected from the class consisting of ethers and tertiary amines having a molecular weight not exceeding 600.

10. The method of fluidizing a viscous suspension of phenylmagnesium chloride in chlorobenzene to provide a mixture containing substantial amounts of phenylmagnesium chloride which comprises adding to said suspension from .003 M to .2 M per mole of phenylmagnesium chloride of an ether fluidizer having a molecular weight which does not exceed 525, whereby a mixture is produced consisting predominantly of phenylmagnesium chloride suspended in chlorobenzene, said chlorobenzene and phenylmagnesium chloride being present in the mixture within the range of about 1 to 6 moles of chlorobenzene per mole of phenylmagnesium chloride after the addition of said fluidizer.

11. The method of fluidizing a viscous suspension of phenylmagnesium chloride in chlorobenzene to provide a mixture containing substantial amounts of phenylmagnesium chloride which comprises adding to said suspension from .003 M to .2 M per mole of phenylmagnesium chloride of a tertiary amine fluidizer having a molecular weight which does not exceed 300, whereby a mixture is produced consisting predominantly of phenylmagnesium chloride suspended in chlorobenzene, said chlorobenzene and phenylmagnesium chloride being present in the mixture within the range of about 1 to 6 moles of chlorobenzene per mole of phenylmagnesium chloride after the addition of said fluidizer.

12. As a composition of matter a fluidized suspension of phenylmagnesium chloride in chlorobenzene comprising a mixture of phenylmagnesium chloride and chlorobenzene to which has been added a small molar fraction, as compared with the number of moles of phenylmagnesium chloride in said suspension, of a fluidizer selected from the class consisting of tertiary amines and ethers, to produce a mixture consisting predominantly of phenylmagnesium chloride and chlorobenzene, said fluidizer having a molecular weight which does not exceed 600.

13. A composition according to claim 12 wherein said fluidizer is added in the ratio of .001 M to .4 M of fluidizer per mole of phenylmagnesium chloride.

14. A composition according to claim 12 wherein said fluidizer is added in the ratio of .003 M to .2 M of fluidizer per mole of phenylmagnesium chloride.

15. As a composition of matter a fluidized suspension of phenylmagnesium chloride in chlorobenzene comprising a mixture of phenylmagnesium chloride and chlorobenzene to which has been added about .001 M to .4 M of an ether fluidizer per mole of phenylmagnesium chloride present in the mixture, said ether fluidizer having a molecular weight which does not exceed 525.

16. A composition according to claim 15 wherein the chlorobenzene and phenylmagnesium chloride are present in the mixture within the range of from 1 to 6 moles of chlorobenzene per mole of phenylmagnesium chloride after addition of said fluidizer.

17. A composition according to claim 16 wherein the fluidizer is added in the range of about .003 M to .2 M of fluidizer per mole of phenylmagnesium chloride.

18. As a composition of matter a fluidized suspension of phenylmagnesium chloride in chlorobenzene comprising a mixture of phenylmagnesium chloride and chlorobenzene to which has been added about .001 M to .4 M of a tertiary amine fluidizer having a molecular weight which does not exceed 300.

19. A composition according to claim 18 wherein the chlorobenzene and phenylmagnesium chloride are present in the mixture within the range of from 1 to 6 moles of chlorobenzene per mole of phenylmagnesium chloride after addition of said fluidizer.

20. A composition according to claim 19 wherein the fluidizer is added in the range of about .003 M to .2 M of fluidizer per mole of phenylmagnesium chloride.

No references cited.